(12) United States Patent
Sakai et al.

(10) Patent No.: US 12,205,078 B2
(45) Date of Patent: Jan. 21, 2025

(54) PROCESSING SYSTEM, PROCESSING METHOD, MAINTENANCE WORKER ASSIST DEVICE AND MAINTENANCE WORKER ASSIST PROGRAM

(71) Applicant: Nippon Telegraph and Telephone Corporation, Tokyo (JP)

(72) Inventors: Masaru Sakai, Tokyo (JP); Satoshi Kondo, Tokyo (JP); Kensuke Takahashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 772 days.

(21) Appl. No.: 17/427,857

(22) PCT Filed: Jan. 30, 2020

(86) PCT No.: PCT/JP2020/003303
§ 371 (c)(1),
(2) Date: Aug. 2, 2021

(87) PCT Pub. No.: WO2020/166343
PCT Pub. Date: Aug. 20, 2020

(65) Prior Publication Data
US 2022/0129863 A1 Apr. 28, 2022

(30) Foreign Application Priority Data
Feb. 13, 2019 (JP) .................. 2019-023496

(51) Int. Cl.
*G06Q 10/20* (2023.01)
*G06Q 10/0639* (2023.01)

(52) U.S. Cl.
CPC ....... *G06Q 10/20* (2013.01); *G06Q 10/06398* (2013.01)

(58) Field of Classification Search
CPC ... G06Q 10/20; G06Q 10/06398; G06F 11/30
See application file for complete search history.

(56) References Cited

U.S. PATENT DOCUMENTS

2004/0193969 A1   9/2004 Nemoto et al.
2007/0192157 A1*  8/2007 Gooch .................. G06Q 10/10
                                                    705/7.41
(Continued)

FOREIGN PATENT DOCUMENTS

| JP | H11259421 | 9/1999 |
| JP | 2000010805 | 1/2000 |
| JP | 2004295811 | 10/2004 |

OTHER PUBLICATIONS

Li, H., Casale, G., & Ellahi, T. (Jan. 2010). SLA-driven planning and optimization of enterprise applications. In Proceedings of the first joint WOSP/SIPEW international conference on Performance engineering (pp. 117-128). (Year: 2010).*

(Continued)

*Primary Examiner* — John S. Wasaff
(74) *Attorney, Agent, or Firm* — Fish & Richardson P.C.

(57) ABSTRACT

Visibility of a message transmitted from a maintenance object system is improved. A maintenance person support device 1 includes: a storage device 10 configured to store distribution rule data 11 in which a category of a message received from a processing unit 2 and an action name of an action corresponding to the message are associated with each other, and action definition data 12 in which the action name and a channel corresponding to the category as execution contents of the action are associated with each other; a message transmission/reception unit 21 configured to receive a message from the processing unit 2; an action execution unit 22 configured to acquire the action name corresponding to the category of the message from the distribution rule data 11 and acquire the execution contents (Continued)

corresponding to the acquired action name from the action definition data; and a user interface control unit 23 configured to display the message to the channel specified by the acquired execution contents.

6 Claims, 6 Drawing Sheets

(56) References Cited

U.S. PATENT DOCUMENTS

| | | | | |
|---|---|---|---|---|
| 2011/0313801 | A1* | 12/2011 | Biewald | G06Q 10/06 705/7.12 |
| 2012/0078387 | A1* | 3/2012 | Kashyap | G05B 23/0272 700/17 |
| 2014/0039648 | A1* | 2/2014 | Boult | G05B 23/0283 700/79 |
| 2017/0308344 | A1* | 10/2017 | Furihata | G05B 23/0216 |
| 2017/0366875 | A1* | 12/2017 | Arunachalam | G06F 3/04847 |
| 2017/0371325 | A1* | 12/2017 | Kodama | G05B 19/41845 |
| 2018/0204165 | A1* | 7/2018 | Yokota | G06Q 10/06316 |
| 2018/0365621 | A1* | 12/2018 | Merg | G09B 7/02 |
| 2020/0167736 | A1* | 5/2020 | Joblin | G06Q 10/1097 |

OTHER PUBLICATIONS

Loewenstern, D., Pinel, F., Shwartz, L., Gatti, M., Herrmann, R., & Cavalcante, V. (Apr. 2012). A learning feature engineering method for task assignment. In 2012 IEEE Network Operations and Management Symposium (pp. 961-967). IEEE. (Year: 2012).*

Sone, RDB Anti-Patterns PostgreSQL and MySQL Failures and Countermeasures 11th Unseen Error Log, Software Design, 2018, 329:128-132, 15 pages (With English Translation).

Yamagoe et al., "SLA Driven Operation—SLA Basis Telecom Operation Optimization and Telecom Service Diversification 1," IEICE Technical Report, 2018, 118(303): 13 pages (With English Translation).

Zabbix LLC, "Zabbix: The Enterprise-Class Open Source Network Monitoring Solution," retrieved on Feb. 1, 2019, retreived from URL <https://www.zabbix.com/jp/>, 13 pages (With English Translation).

* cited by examiner

11 DISTRIBUTION RULE DATA

| MESSAGE CATEGORY | ACTION NAME |
|---|---|
| Notice | MAINTENANCE PERSON NOTIFICATION |
| Request | MAINTENANCE PERSON APPROVAL REQUEST REGISTRATION |
| Info | ACTION EXECUTION NOTIFICATION |

Fig. 4

12 ACTION DEFINITION DATA

| ACTION NAME | EXECUTION CONTENTS |
|---|---|
| MAINTENANCE PERSON NOTIFICATION | TRANSMIT MESSAGE TO "NOTIFICATION" CHANNEL |
| MAINTENANCE PERSON APPROVAL REQUEST REGISTRATION | TRANSMIT APPROVAL REQUEST MESSAGE TO "MAINTENANCE PERSON APPROVAL" CHANNEL |
| ACTION EXECUTION NOTIFICATION | TRANSMIT MESSAGE TO "ACTION EXECUTION NOTIFICATION" CHANNEL |

Fig. 5

PROCESSING SYSTEM, PROCESSING METHOD, MAINTENANCE WORKER ASSIST DEVICE AND MAINTENANCE WORKER ASSIST PROGRAM

CROSS-REFERENCE TO RELATED APPLICATIONS

This application is a National Stage application under 35 U.S.C. § 371 of International Application No. PCT/JP2020/003303, having an International Filing Date of Jan. 30, 2020, which claims priority to Japanese Application Serial No. 2019-023496, filed on Feb. 13, 2019. The disclosure of the prior application is considered part of the disclosure of this application, and is incorporated in its entirety into this application.

TECHNICAL FIELD

The present invention relates to a processing system including a processing unit and a maintenance person support device which displays to a maintenance person a maintenance-related message received from the processing unit, a processing method, the maintenance person support device, and a maintenance person support program.

BACKGROUND ART

With advancement of information communication in recent years, a technology of automating an operation process in an information communication system has been generalized (see Non-Patent Literature 1). The Non-Patent Literature 1 relates to automation of installation and setting of software, verification of service normality that is performed periodically, regular fault response and the like. In addition, the individual automated processes notify a maintenance person when the processes are started and ended or the like.

Further, when introducing an NFV/SDN (Network Function Virtualization/Software-Defined Networking) technology to a telecom service base, an SLA Driven Operation, which is based on a quality target value (SLA: Service Level Agreement), to automate maintenance determination of response necessity, a time limit and priority or the like is disclosed (see Non-Patent Literature 2). The SLA Driven Operation provides optimization of a maintenance level of each service, coping with diversification and changes of maintenance object services, and repair operation reduction/standardization.

CITATION LIST

Non-Patent Literature

Non-Patent Literature 1: Zabbix LLC, "ZABBIX", [online], Zabbix LLC, [searched on Feb. 1, 2019], Internet <URL: https://www.zabbix.com/jp/>

Non-Patent Literature 2: SLA Driven Operation. Kyoko Yamagoe et al. (NTT), Nov. 16, 2018, Technical Committee on Information and Communication Management (ICM)

SUMMARY OF THE INVENTION

Technical Problem

In a system disclosed in the Non-Patent Literature 2, a large amount of messages may be transmitted from a processing unit to a maintenance person. The maintenance person needs to find and cope with, among a large quantity of messages, such messages requiring response by the maintenance person, such as a message requiring an approval and an important message requiring emergency response.

Therefore, an object of the present invention is to provide a maintenance person support device, a maintenance person support method and a maintenance person support program that improve visibility of a message transmitted from a maintenance object system.

Means for Solving the Problem

In order to solve the above-described problem, a first feature of the present invention relates to a processing system including a processing unit and a maintenance person support device which displays a maintenance-related message received from the processing unit to a maintenance person. In the first feature of the present invention, the processing unit outputs the maintenance-related message to the maintenance person support device, and the maintenance person support device includes: a storage device configured to store distribution rule data in which a category of a message received from the processing unit and an action name of an action corresponding to the message are associated with each other, and action definition data in which the action name and a channel corresponding to the category as execution contents of the action are associated with each other; a message transmission/reception unit configured to receive a message from the processing unit; an action execution unit configured to acquire the action name corresponding to the category of the message from the distribution rule data and acquire the execution contents corresponding to the acquired action name from the action definition data; and a user interface control unit configured to display the message to the channel specified by the acquired execution contents.

A second feature of the present invention relates to a processing method used in a processing system including a processing unit and a maintenance person support device which displays a maintenance-related message received from the processing unit to a maintenance person. The processing method relating to the second feature of the present invention includes the steps of: storing, by the maintenance person support device, distribution rule data in which a category of a message received from the processing unit and an action name of an action corresponding to the message are associated with each other and action definition data in which the action name and a channel corresponding to the category as execution contents of the action are associated with each other in a storage device; outputting, by the processing unit, the maintenance-related message to the maintenance person support device; receiving, by the maintenance person support device, a message from the processing unit; by the maintenance person support device, acquiring the action name corresponding to the category of the message from the distribution rule data, and acquiring the execution contents corresponding to the acquired action name from the action definition data; and displaying, by the maintenance person support device, the message to the channel specified by the acquired execution contents.

A third feature of the present invention relates to a maintenance person support device which displays a maintenance-related message received from a processing unit to a maintenance person in a processing system including the processing unit. The maintenance person support device relating to the third feature of the present invention includes: a storage device configured to store a distribution rule data in which a category of a message received from the processing unit and an action name of an action corresponding to the message are associated with each other, and action definition data in which the action name and a channel corresponding to the category as execution contents of the action are associated with each other; a message transmission/reception unit configured to receive a message from the processing unit; an action execution unit configured to acquire the action name corresponding to the category of the message from the distribution rule data and acquire the execution contents corresponding to the acquired action name from the action definition data; and a user interface control unit configured to display the message to the channel specified by the acquired execution contents.

The user interface control unit may notify the message transmission/reception unit of a fact that an approval command is inputted for a displayed message, and the message transmission/reception unit may transmit a message indicating that an approval is completed to the processing unit.

The user interface control unit may notify the message transmission/reception unit when the approval command is inputted in the channel requesting input of the approval command.

A fourth feature of the present invention relates to a maintenance person support program for making a computer function as the maintenance person support device described in the third feature of the present invention.

Effects of the Invention

According to the present invention, a maintenance person support device, a maintenance person support method and a maintenance person support program that improve visibility of a message transmitted from a maintenance object system can be provided.

DESCRIPTION OF EMBODIMENTS

Next, with reference to the drawings, the embodiment of the present invention will be described. In the description of the drawings below, identical or similar signs are attached to identical or similar parts.

(Processing System)

Figure 1:
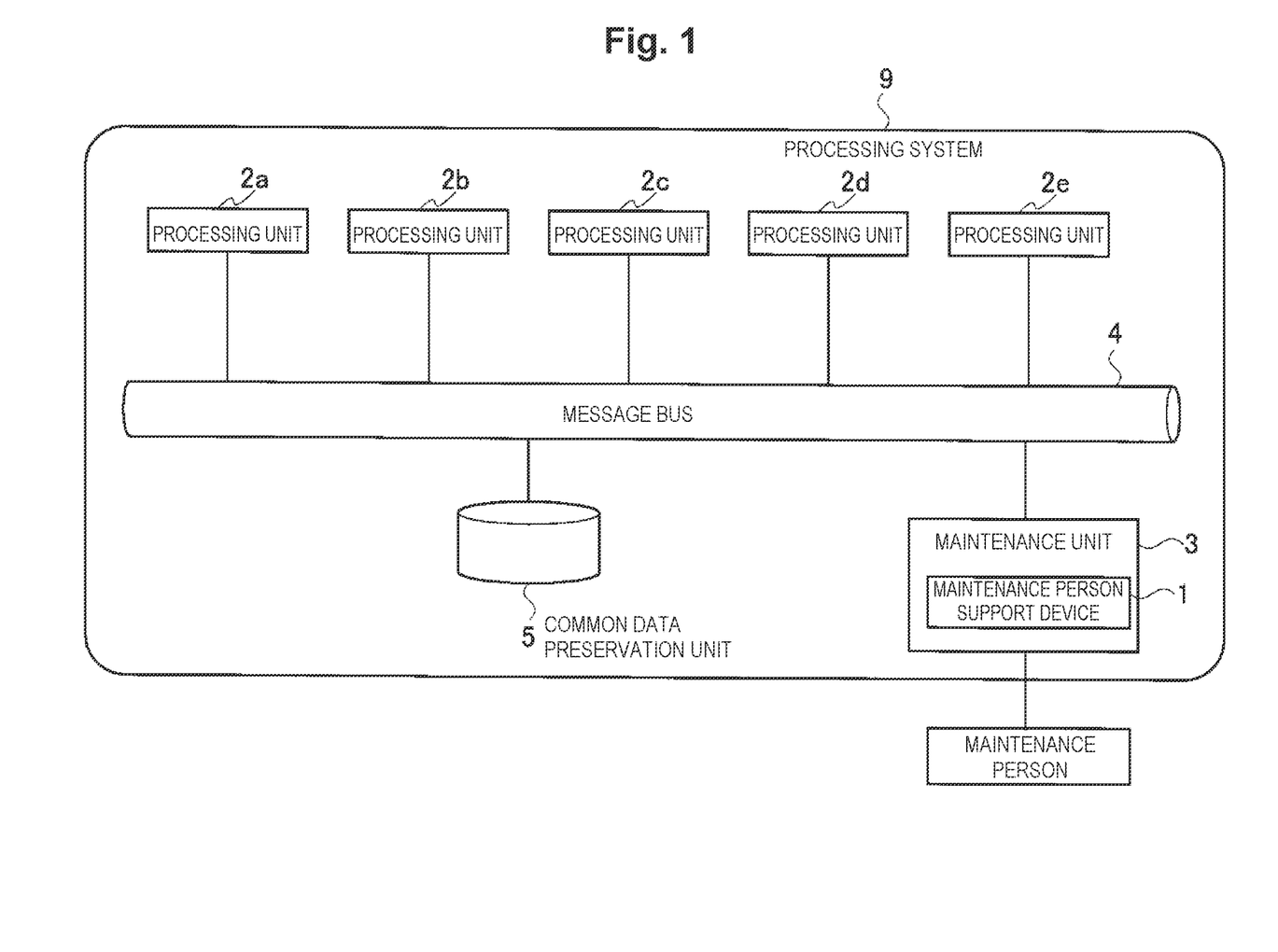
FIG. 1 is a diagram describing a system configuration of a processing system relating to an embodiment of the present invention.

With reference to FIG. 1, a processing system 9 including a maintenance person support device 1 relating to the embodiment of the present invention will be described. The processing system 9 includes processing units 2a, 2b, 2c, 2d and 2e, a maintenance unit 3, and a common data preservation unit 5. The processing units 2a, 2b, 2c, 2d and 2e, the maintenance unit 3 and the common data preservation unit 5 are mutually communicably connected by a message path 4 which is a communication network.

In the embodiment of the present invention, when not specially distinguishing the processing units 2a, 2b, 2c, 2d and 2e, the processing units may be written simply as processing unit 2. Further, in the processing system 9 illustrated in FIG. 1, the case of including five processing units 2 will be described, but at least one processing unit 2 is sufficient and the number does not matter.

The processing unit 2 is a maintenance object by the maintenance person support device 1. The processing unit 2 achieves functions demanded in the processing system 9, such as a function of collecting information, a function of analyzing the information, a function of manipulating the information, a function of performing tests and a function of changing a configuration. The processing unit 2 outputs a maintenance-related message to the maintenance unit 3 (maintenance person support device 1).

The maintenance unit 3 achieves a maintenance function in the processing system 9. The maintenance unit 3 processes the message outputted by the processing unit 2 and displays the message to a maintenance person. The maintenance unit 3 is implemented by the maintenance person support device 1. The maintenance person support device 1 achieves a function of displaying the maintenance-related message received from the processing unit 2 to the maintenance person and a function of notifying the processing unit 2 of an instruction by the maintenance person for the message.

The common data preservation unit 5 preserves data shared by the processing unit 2 and the maintenance unit 3. The processing unit 2 and the maintenance unit 3 update and refer to the data in the common data preservation unit as needed.

(Maintenance Person Support Device)

Figure 2:
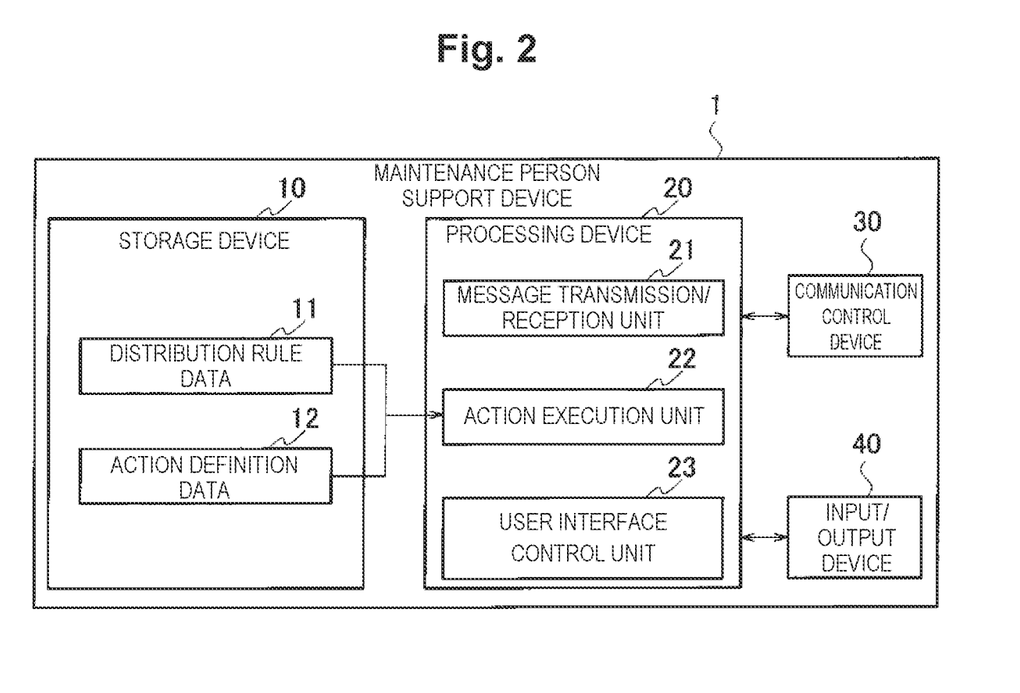
FIG. 2 is a diagram describing a hardware configuration and a functional block of a maintenance person support device relating to the embodiment of the present invention.

With reference to FIG. 2, the maintenance person support device 1 relating to the embodiment of the present invention will be described.

The maintenance person support device 1 includes a storage device 10, a processing device 20, a communication control device 30 and an input/output device 40. The maintenance person support device 1 may be one general computer incorporating the storage device 10, the processing device 20, the communication control device 30 and the input/output device 40, or may be a virtual computer formed of a plurality of pieces of hardware. In addition, the maintenance person support device 1 may be a computer to which some devices are externally connected such that the input/output device 40 is not incorporated in the maintenance person support device 1 and is connected by cable communication or wireless communication or the like. For the maintenance person support device 1, by such a computer executing a maintenance person support program, the functions illustrated in FIG. 2 are achieved.

The storage device 10 is a ROM (Read Only Memory), a RAM (Random access memory), a hard disk or the like, and stores various kinds of data such as input data, output data and intermediate data for the processing device 20 to execute processing. The processing device 20 is a CPU (Central Processing Unit), and executes the processing in the maintenance person support device 1 by reading and writing the data stored in the storage device 10 and inputting and outputting the data to/from the communication control device 30 and the input/output device 40. The communication control device 30 is an interface for the maintenance person support device 1 to communicably connect with the processing unit 2 and the common data preservation unit 5. The input/output device 40 is a display, a mouse, a display device or the like and displays a processing result to the maintenance person and inputs an instruction of the maintenance person.

The storage device 10 stores the maintenance person support program and also stores distribution rule data 11 and action definition data 12.

The distribution rule data 11 is the data in which a category of the message received from the processing unit 2 and an action name of an action corresponding to the message are associated with each other. The distribution rule data 11 makes the action name corresponding to processing executed by the maintenance person support device 1 correspond to each category of the message.

Figure 3:
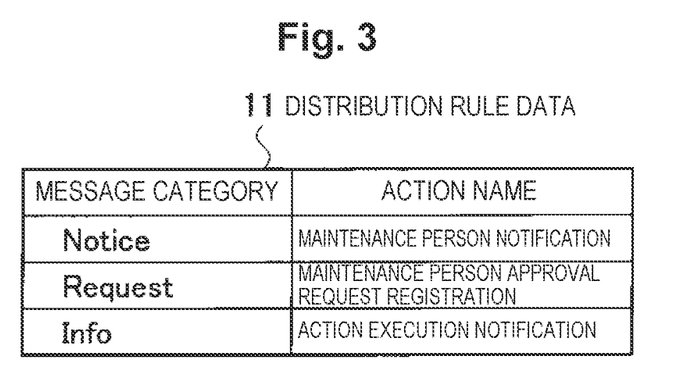
FIG. 3 is a diagram describing a data structure of distribution rule data and an example of data.

The distribution rule data 11 includes, for example, "Notice", "Request" and "Info" as the category of the message as illustrated in FIG. 3. "Notice" means a message of high importance. "Request" means a message requiring an approval of the maintenance person when advancing the processing. "Info" means a message of low importance. As the category of the message, any category other than "Notice", "Request" and "Info" may be set.

The action definition data 12 is the data in which the action name and a channel corresponding to the category as execution contents of the action are associated with each other. The channel is the category when displaying the message to the maintenance person.

Figure 4:
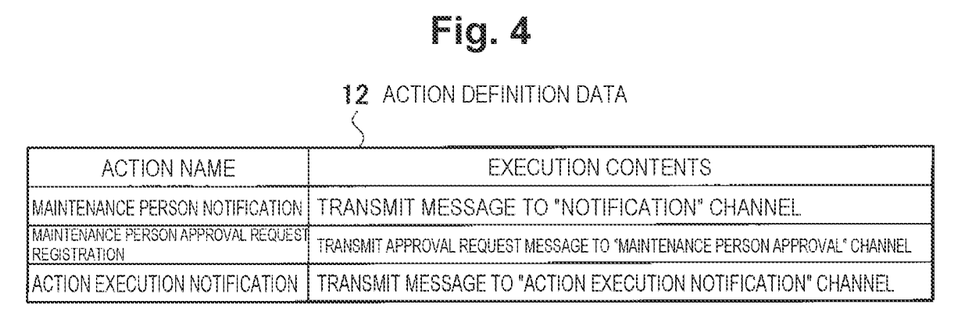
FIG. 4 is a diagram describing a data structure of action definition data and an example of data.

The action definition data 12 makes the execution contents correspond to the individual actions defined in the distribution rule data 11 in FIG. 3, as illustrated in FIG. 4. In addition, the execution contents may be a script that specifies the channel when displaying the message corresponding to the individual actions and defines that the message is to be transmitted to the specified channel.

Note that the message category and the action name are in one-to-one correspondence and the action name and the execution contents are in one-to-one correspondence in examples illustrated in FIG. 3 and FIG. 4, however, the correspondence is not limited thereto. For example, the plurality of message categories may correspond to one action name or the like.

Also, when the message category or the action is added, the distribution rule data 11 or the action definition data 12 may be updated. It is not needed to update the maintenance person support program, and a cost required for maintenance is suppressed.

The processing device 20 includes a message transmission/reception unit 21, an action execution unit 22 and a user interface control unit 23.

The message transmission/reception unit 21 receives the message from the processing unit 2. The message transmitted from the processing unit 2 is the message relating to the maintenance of the processing unit 2. The message transmission/reception unit 21 makes the action execution unit 22 process the received message. An identifier of the message is imparted respectively to the message, and control is performed so as to identify each message.

In addition, when the message received from the processing unit 2 is displayed to the maintenance person and an approval command is inputted from the maintenance person, the message transmission/reception unit 21 transmits the message indicating that the approval is completed to the processing unit 2. The message transmission/reception unit 21 makes the identifier of the object message that the maintenance person has approved and a flag indicating that the message is approved correspond to each other and returns the message to the processing unit 2.

The action execution unit 22 acquires the action name corresponding to the category of the message from the distribution rule data 11, and acquires the execution contents corresponding to the acquired action name from the action definition data 12. Here, the category of the message may be set to the message received from the processing unit 2, or the category of the message may be set by a predetermined rule based on the flag in the message or the like. The action execution unit 22 refers to the distribution rule data 11 and the action definition data 12 and specifies the channel to display the message.

The user interface control unit 23 displays the message to the channel specified by the acquired execution contents. The user interface control unit 23 displays the message received by the message transmission/reception unit 21 to the channel specified by the action execution unit 22.

In addition, the user interface control unit 23 notifies the message transmission/reception unit 21 of the fact that the approval command is inputted for the displayed message. At the time, the user interface control unit 23 may perform control so as to make the approval command and the identifier of the message of an approval object correspond to each other.

When the approval command is inputted in the channel requesting the input of the approval command, the user interface control unit 23 notifies the message transmission/reception unit 21. For example, when the approval command is inputted in the channel requesting the approval of the maintenance person like a maintenance person approval channel, the user interface control unit 23 notifies the message transmission/reception unit 21 of the inputted approval command. On the other hand, when the message of the approval command or the like is inputted in the channel not requesting the approval of the maintenance person like a maintenance person notification channel and an action execution notification channel, the user interface control unit 23 does not notify the message transmission/reception unit 21 of the inputted message.

Figure 5:
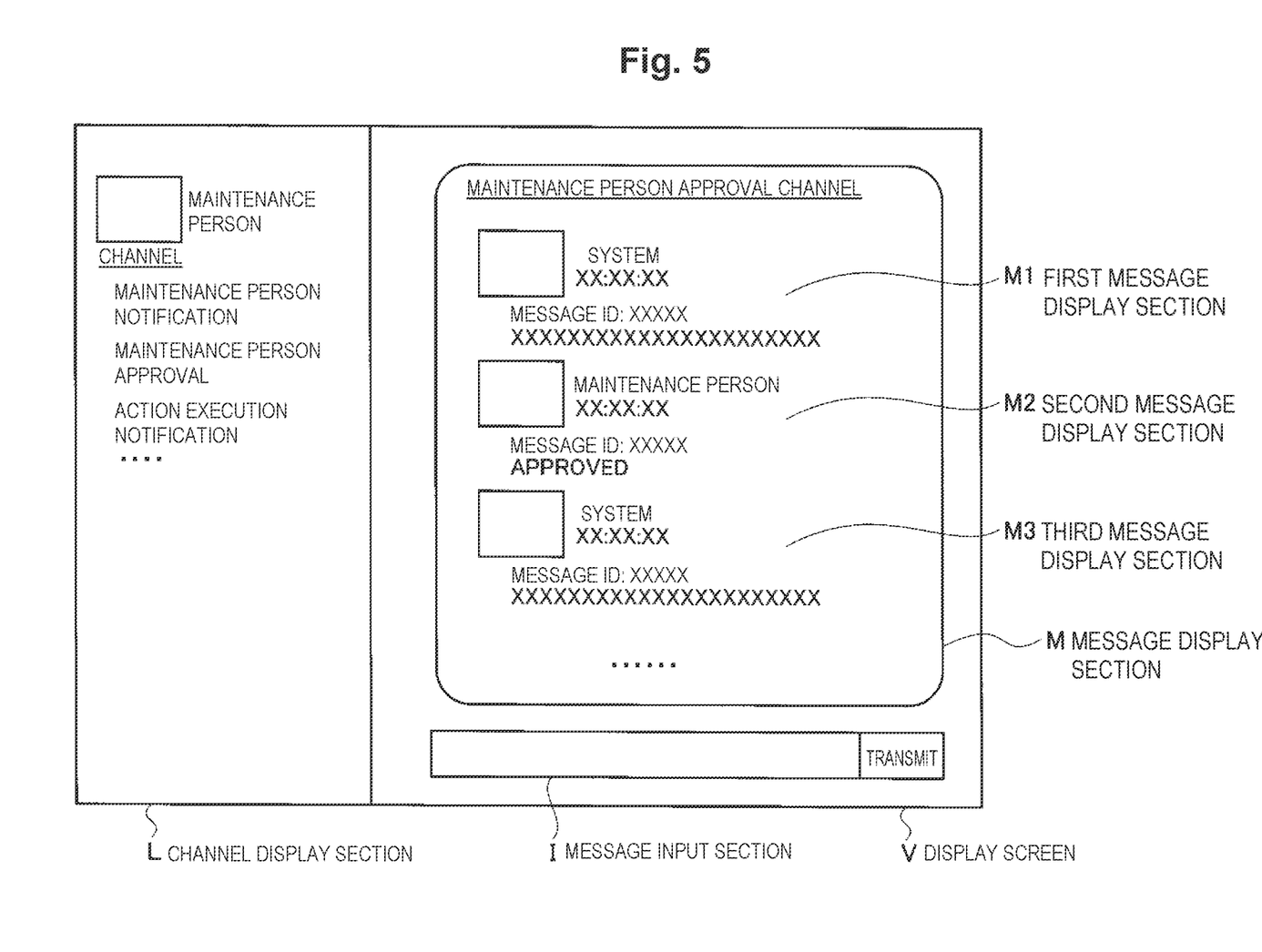
FIG. 5 is an example of a screen displayed by the maintenance person support device relating to the embodiment of the present invention.

With reference to FIG. 5, an example of a display screen V displayed by the user interface control unit 23 will be described. The display screen V includes a channel display section L, a message display section M and a message input section I. The channel display section L displays the individual channels defined by the execution contents of the action definition data 12. The message display section M displays the message relating to the channel selected in the channel display section L. The message input section I is a message input column for the maintenance person, and when a send button is selected, the message inputted by the maintenance person is notified to the message transmission/reception unit 21.

In the example illustrated in FIG. 5, three messages relating to the maintenance person approval channel are displayed in a time-sequential manner in the message display section M. The individual messages displayed in a first message display section M1 and a second message display section M2 are the messages transmitted from the processing unit 2 and are the messages requesting the approval of the maintenance person. The second message display section M2 is the message indicating that the message displayed in the first message display section M1 is approved by the maintenance person. In the example illustrated in FIG. 5, when the maintenance person inputs the approval command of "APPROVED", the message transmission/reception unit 21 is notified of the fact that the approval command is inputted. For example, when the maintenance person selects the first message display section M1 and then the approval command is inputted to the message input section I, the user interface control unit 23 may recognize the approval command to the message in the first message display section M1, and transmit the identifier of the message and the approval command to the message transmission/reception unit 21.

Note that the display screen illustrated in FIG. 5 is implemented by a communication tool but it is not limited thereto. The display screen illustrated in FIG. 5 may be formed by implementing a function required for the user interface control unit 23 of the maintenance person support device 1 in a general chat application.

Figure 6:
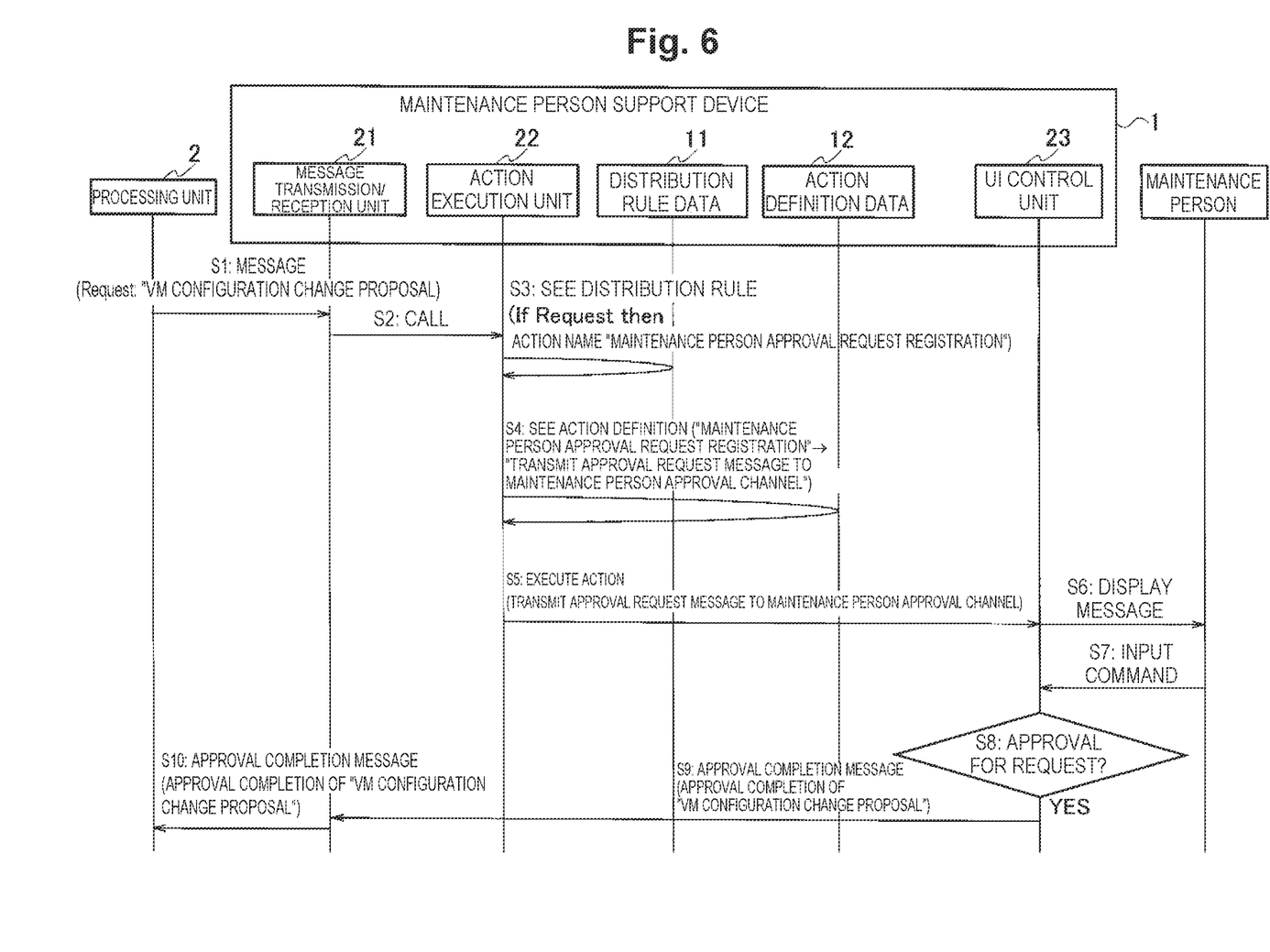
FIG. 6 is a sequence diagram describing a processing method in the processing system relating to the embodiment of the present invention.

With reference to FIG. 6, a processing method in the processing system 9 relating to the embodiment of the present invention will be described.

First, a message is transmitted from the processing unit 2 to the maintenance person support device 1 in step S1. It is assumed that the message is the message of a VM configuration change proposal, for which the category is set to "Request". When the message is received in step S1, the message transmission/reception unit 21 delivers the received message to the action execution unit 22 in step S2.

The action execution unit 22 refers to the distribution rule data 11 in step S3, and specifies an action name "maintenance person approval request registration" corresponding to the category "Request". The action execution unit 22 refers to the action definition data 12 in step S4, and specifies the execution contents "transmit approval request message to maintenance person approval channel" corresponding to the action name "maintenance person approval request registration".

In step S5, the action execution unit 22 executes the action specified in step S4. The user interface control unit 23 receives the approval request message from the action execution unit 22 in step S6, and displays the approval request message to the maintenance person approval channel in step S6. The approval request message displayed in the maintenance person approval channel is turned to a state viewable for the maintenance person.

When the approval request message is viewed by the maintenance person and the command for the message contents is inputted in step S7, the user interface control unit 23 determines whether or not the command is the approval command for the request. The maintenance person approval channel is the channel requesting the approval of the maintenance person. When the command inputted by the maintenance person is the approval command, the user interface control unit 23 transmits an approval completion message to the message transmission/reception unit 21. The approval completion message may include the identifier of the message of an approval object.

When the approval completion message is received, the message transmission/reception unit 21 transmits the approval completion message as a response to the request in step S1.

According to such a maintenance person support device 1 relating to the embodiment of the present invention, since the message is displayed to the channel corresponding to the category of the message received from the processing unit 2, visibility of the message is improved, and it becomes easy for the maintenance person to recognize a situation in the processing system 9. In addition, by displaying the message requiring the approval and inputting the approval command for the message on the same screen, reception of the message and input of the command of the maintenance person can be seamlessly performed.

Other Embodiment

Although the present invention is described by the embodiment as mentioned above, it should not be understood that the description and the drawings forming a part of the disclosure limit the invention. From the disclosure, various alternative embodiments, examples and operational techniques will be apparent to those skilled in the art.

For example, the maintenance person support device described in the embodiment of the present invention may be configured on one piece of hardware as illustrated in FIG. 1 or may be configured on the plurality of pieces of hardware according to the function and the number of pieces of processing.

The present invention naturally includes various embodiments or the like that are not described herein. Therefore, the technical scope of the present invention is defined only by matters specifying the invention according to the scope of claims reasonable from the above description.

REFERENCE SIGNS LIST

1 Maintenance person support device
2 Processing unit
3 Maintenance unit
4 message path
5 Common data preservation unit
9 Processing system
10 Storage device
11 Distribution rule data
12 Action definition data
20 Processing device
21 Message transmission/reception unit
22 Action execution unit
23 User interface control unit
30 Communication control device
40 Input/output device

The invention claimed is:

1. A processing system comprising:
a processing unit, including one or more processors, configured to transmit a virtual machine configuration change proposal to a maintenance person support device; and
the maintenance person support device configured to display a maintenance-related message received from the processing unit to a maintenance person the maintenance person support device comprises:
a storage device configured to store distribution rule data in which a category of the virtual machine configuration change proposal and an action name of an action corresponding to the virtual machine configuration change proposal are associated with each other, and action definition data in which the action name and a channel corresponding to the category as execution contents of the action are associated with each other;
a message transmission/reception unit, including one or more processors, configured to receive the virtual machine configuration change proposal from the processing unit;
an action execution unit, including one or more processors, configured to acquire the action name corresponding to the category of the virtual machine configuration change proposal from the distribution rule data and acquire the execution contents corresponding to the acquired action name from the action definition data; and a user interface control unit, including one or more processors, configured to;
  display the virtual machine configuration change proposal to the channel on a display specified by the acquired execution contents;
  in response to displaying the virtual machine configuration change proposal, receive, through the display, a command from the maintenance person;
  determine whether the command corresponds to an approval completion message; and
  in response to determining that the command corresponds to the approval completion message, transmit the approval completion message to the message transmission/reception unit for notifying the processing unit.

2. The processing system according to claim 1, wherein the user interface control unit is configured to notify the message transmission/reception unit when the approval command is inputted in the channel requesting input of the approval command.

3. A processing method used in a processing system, the processing system comprising a processing unit and a maintenance person support device, the processing method comprising:
  transmitting, by a processing unit, a virtual machine configuration change proposal to a maintenance person support device;
  storing, by the maintenance person support device, distribution rule data in which a category of the virtual machine configuration change proposal and an action name of an action corresponding to the message virtual machine configuration change proposal are associated with each other and action definition data in which the action name and a channel corresponding to the category as execution contents of the action are associated with each other in a storage device;
  receiving, by the maintenance person support device, the virtual machine configuration change proposal from the processing unit;
  acquiring, by the maintenance person support device, the action name corresponding to the category of the virtual machine configuration change proposal from the distribution rule data;
  acquiring, by the maintenance person support device, the execution contents corresponding to the acquired action name from the action definition data;
  displaying, by the maintenance person support device, the virtual machine configuration change proposal to the channel on a display specified by the acquired execution contents;
  in response to displaying the virtual machine configuration change proposal, receiving, by the maintenance person support device and through the display, a command from the maintenance person;
  determining, by the maintenance person support device, whether the command corresponds to an approval completion message; and
  in response to determining that the command corresponds to the approval completion message, transmitting, by the maintenance person support device, the approval completion message to the message transmission/reception unit for notifying the processing unit.

4. The processing method of claim 3, further comprising: notifying, by the maintenance person support device, the message transmission/reception unit when the approval command is inputted in the channel requesting input of the approval command.

5. A maintenance person support device comprising:
  a storage device configured to store a distribution rule data in which a category of a virtual machine configuration change proposal received from the processing unit and an action name of an action corresponding to the virtual machine configuration change proposal are associated with each other, and action definition data in which the action name and a channel corresponding to the category as execution contents of the action are associated with each other;
  a message transmission/reception unit, including one or more processors, configured to receive the virtual machine configuration change proposal from the processing unit;
  an action execution unit, including one or more processors, configured to acquire the action name corresponding to the category of the virtual machine configuration change proposal from the distribution rule data and acquire the execution contents corresponding to the acquired action name from the action definition data; and
  a user interface control unit, including one or more processors, configured to:
    display the virtual machine configuration change proposal to the channel on a display specified by the acquired execution contents;
    in response to displaying the virtual machine configuration change proposal, receive, through the display, a command from the maintenance person;
    determine whether the command corresponds to an approval completion message; and
    in response to determining that the command corresponds to the approval completion message, transmit the approval completion message to the message transmission/reception unit for notifying the processing unit.

6. The maintenance person support device according to claim 5, wherein the user interface control unit is configured to notify the message transmission/reception unit when the approval command is inputted in the channel requesting input of the approval command.

* * * * *